(12) United States Patent
Seraj et al.

(10) Patent No.: US 9,178,289 B2
(45) Date of Patent: Nov. 3, 2015

(54) JOINT BODIES AND METHODS FOR COVERING ELECTRICAL CABLES AND CONNECTIONS

(71) Applicants: Tyco Electronics Corporation, Berwyn, PA (US); Tyco Electronics Raychem GmbH, Ottobrunn (DE)

(72) Inventors: Mahmoud K. Seraj, Apex, NC (US); Harry George Yaworski, Apex, NC (US); Markus Hardi, Neubiberg (DE); Ladislaus Kehl, Dorfen (DE)

(73) Assignees: Tyco Electronics Corporation, Berwyn, PA (US); Tyco Electronics Raychem GmBH, Ottobrunn (DE)

(*) Notice: Subject to any disclaimer, the term of this patent is extended or adjusted under 35 U.S.C. 154(b) by 193 days.

(21) Appl. No.: 13/894,061

(22) Filed: May 14, 2013

(65) Prior Publication Data
US 2014/0338953 A1    Nov. 20, 2014

(51) Int. Cl.
*H02G 15/02* (2006.01)
*H01R 4/70* (2006.01)
*H01R 43/26* (2006.01)
(Continued)

(52) U.S. Cl.
CPC ................. *H01R 4/70* (2013.01); *H01R 43/26* (2013.01); *H02G 15/1826* (2013.01); *H02G 15/003* (2013.01); *H02G 15/013* (2013.01); *H02G 15/184* (2013.01); *Y10T 29/49117* (2015.01); *Y10T 29/49227* (2015.01)

(58) Field of Classification Search
CPC ....................................................... H01G 1/00
USPC ........ 174/74 R, 77 R, 84 R, 91, 92, 74 A, 93, 174/73.1, 138 F, DIG. 8, 77, 85; 428/36.9, 428/36.91, 36.92, 34.9, 35.1, 35.7, 36.8; 138/103, 178; 29/631, 605, 870, 869
See application file for complete search history.

(56) References Cited

U.S. PATENT DOCUMENTS 3,816,640 A * 6/1974 Varner .......................... 174/73.1
3,876,820 A * 4/1975 Mashikian ....................... 174/19

(Continued)

FOREIGN PATENT DOCUMENTS

EP          0 209 399 A2    1/1987
WO      WO 91/13756 A1    9/1991

(Continued)

OTHER PUBLICATIONS

"Rayvolve™ Insulating Joint Cover for up to 1000V Solid Dielectric Cable" Tyco Electronics, PII-54907, Rev AG, PCN 650355-000, Nov. 20, 2000, 3 pages.

(Continued)

*Primary Examiner* — William H Mayo, III
(74) *Attorney, Agent, or Firm* — Myers Bigel Sibley & Sajovec, PA

(57) ABSTRACT

A joint body for protecting an electrical cable connection including an electrical cable includes an expandable, elastomeric bladder sleeve and an electrically insulating gel. The bladder sleeve defines a gel cavity and a cable passage to receive the electrical cable. The gel is disposed in the gel cavity and surrounds at least a portion of the cable passage. The joint body is configured to be installed on the connection such that the connection is disposed in the cable passage and is surrounded and electrically insulated by the gel.

23 Claims, 10 Drawing Sheets

(51) Int. Cl.
*H02G 15/18* (2006.01)
*H02G 15/00* (2006.01)
*H02G 15/013* (2006.01)
*H02G 15/184* (2006.01)

(56) References Cited

U.S. PATENT DOCUMENTS

| | | | | |
|---|---|---|---|---|
| 4,070,746 | A * | 1/1978 | Evans et al. | 29/450 |
| 4,383,131 | A * | 5/1983 | Clabburn | 174/73.1 |
| 4,497,926 | A * | 2/1985 | Toy | 524/271 |
| 4,506,430 | A * | 3/1985 | Guzay, Jr. | 29/450 |
| 4,559,973 | A * | 12/1985 | Hane et al. | 138/138 |
| 4,885,432 | A * | 12/1989 | Amoyal et al. | 174/92 |
| 4,915,990 | A * | 4/1990 | Chang | 428/34.9 |
| 4,943,685 | A | 7/1990 | Reynaert | |
| 5,070,597 | A * | 12/1991 | Holt et al. | 29/887 |
| 5,735,981 | A * | 4/1998 | Winfield et al. | 156/52 |
| 5,804,767 | A * | 9/1998 | Winfield et al. | 174/74 R |
| 5,900,585 | A * | 5/1999 | Winfield et al. | 174/74 R |
| 5,952,612 | A * | 9/1999 | Winfield et al. | 174/74 R |
| 6,103,975 | A * | 8/2000 | Krabs et al. | 174/74 A |
| 6,171,669 | B1 * | 1/2001 | Vallauri et al. | 428/34.9 |
| 6,245,999 | B1 * | 6/2001 | Costigan et al. | 174/74 A |
| 6,762,364 | B2 * | 7/2004 | Hofmann et al. | 174/84 R |
| 7,476,114 | B1 | 1/2009 | Contreras | |
| 7,853,521 | B2 | 12/2010 | Williams | |
| 7,863,521 | B2 | 1/2011 | Campbell et al. | |
| 7,901,243 | B1 | 3/2011 | Yaworski | |
| 2003/0141094 | A1* | 7/2003 | Hofmann et al. | 174/84 R |
| 2009/0283294 | A1 | 11/2009 | Bukovnik | |
| 2010/0279542 | A1 | 11/2010 | Seraj et al. | |

FOREIGN PATENT DOCUMENTS

| | | |
|---|---|---|
| WO | WO 96/02079 | 1/1996 |
| WO | WO 2012/159680 A2 | 11/2012 |

OTHER PUBLICATIONS

Splice for PILC-to-PILC or PILC-to-Extruded Dielectric (Poly/EPR) Power Cable, Raychem Tyco Electronics-Energy, PII-54866, Rev AD, PCN 528421-000, Mar. 14, 2000, 14 pages.
"RSTI Screened, Separable Connection System 630 A up to 24 kV" Tyco Electronics Raychem GmbH, Energy Division, EPP 0800 Jun. 2004, 6 pages.
"RSTI Screened, Separable Connection System 630 A up to (36) 42 kV" Tyco Electronics Raychem GmbH, Energy Division, EPP 0998 Dec. 2003, 4 pages.
"CSJA Cold Shrinkable "All-In-One" Straight Joint for Polymeric Insulated Cables up to 42 kV" Tyco Electronics, EPP 1348 Jul. 2007, 4 pages.
"CSJA In-line Cold Shrinkable Joint for 1/C Shielded Power Cables (15-35kV)" Tyco Electronics, 8-1773445-0, E258 Feb. 2008, 2006/2007, 2 pages.
"Kabeldon Cable Accessories 1-420 kV" ABB, 4 pages.
"Product Note Kabeldon Pre-assembled Dry Cable Termination, 145 kV TD 145" ABB, 7ABA102309_REV 1, 2006/2007, 2 pages.
"Cover Assemblies for Cables and Electrical Connections and Methods for Making and Using the Same" U.S. Appl. No. 12/506,856, filed Jul. 21, 2009, 26 pages.
"Methods and Kits for Covering Electrical Cables and Connections" U.S. Appl. No. 12/572,875, filed Oct. 2, 2009, 26 pages.
Notification of Transmittal of the International Search Report and the Written Opinion of the International Searching Authority, or the Declaration, in corresponding PCT Application No. PCT/US2014/037688 mailed Oct. 16, 2014 (11 pages).

* cited by examiner

JOINT BODIES AND METHODS FOR COVERING ELECTRICAL CABLES AND CONNECTIONS

FIELD OF THE INVENTION

The present invention relates to electrical cables and connections and, more particularly, to protective covers for electrical cables and electrical connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

SUMMARY OF THE INVENTION

According to embodiments of the present invention, a joint body for protecting an electrical cable connection including an electrical cable includes an expandable, elastomeric bladder sleeve and an electrically insulating gel. The bladder sleeve defines a gel cavity and a cable passage to receive the electrical cable. The gel is disposed in the gel cavity and surrounds at least a portion of the cable passage. The joint body is configured to be installed on the connection such that the connection is disposed in the cable passage and is surrounded and electrically insulated by the gel.

According to method embodiments of the invention, a method of protecting an electrical cable connection including an electrical cable includes providing a joint body including: an expandable, elastomeric bladder sleeve defining a gel cavity and a cable passage to receive the electrical cable; and an electrically insulating gel disposed in the gel cavity and surrounding at least a portion of the cable passage. The method further includes installing the joint body on the connection such that the connection is disposed in the cable passage and is surrounded and electrically insulated by the gel.

According to embodiments of the invention, a protected connection assembly includes an electrical cable connection and a joint body. The connection includes an electrical cable. The joint body includes an expandable, elastomeric bladder sleeve and an electrically insulating gel. The bladder sleeve defines a gel cavity and a cable passage to receive the electrical cable. The gel is disposed in the gel cavity and surrounds at least a portion of the cable passage. The joint body as installed on the connection such that the connection is disposed in the cable passage and is surrounded and electrically insulated by the gel.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
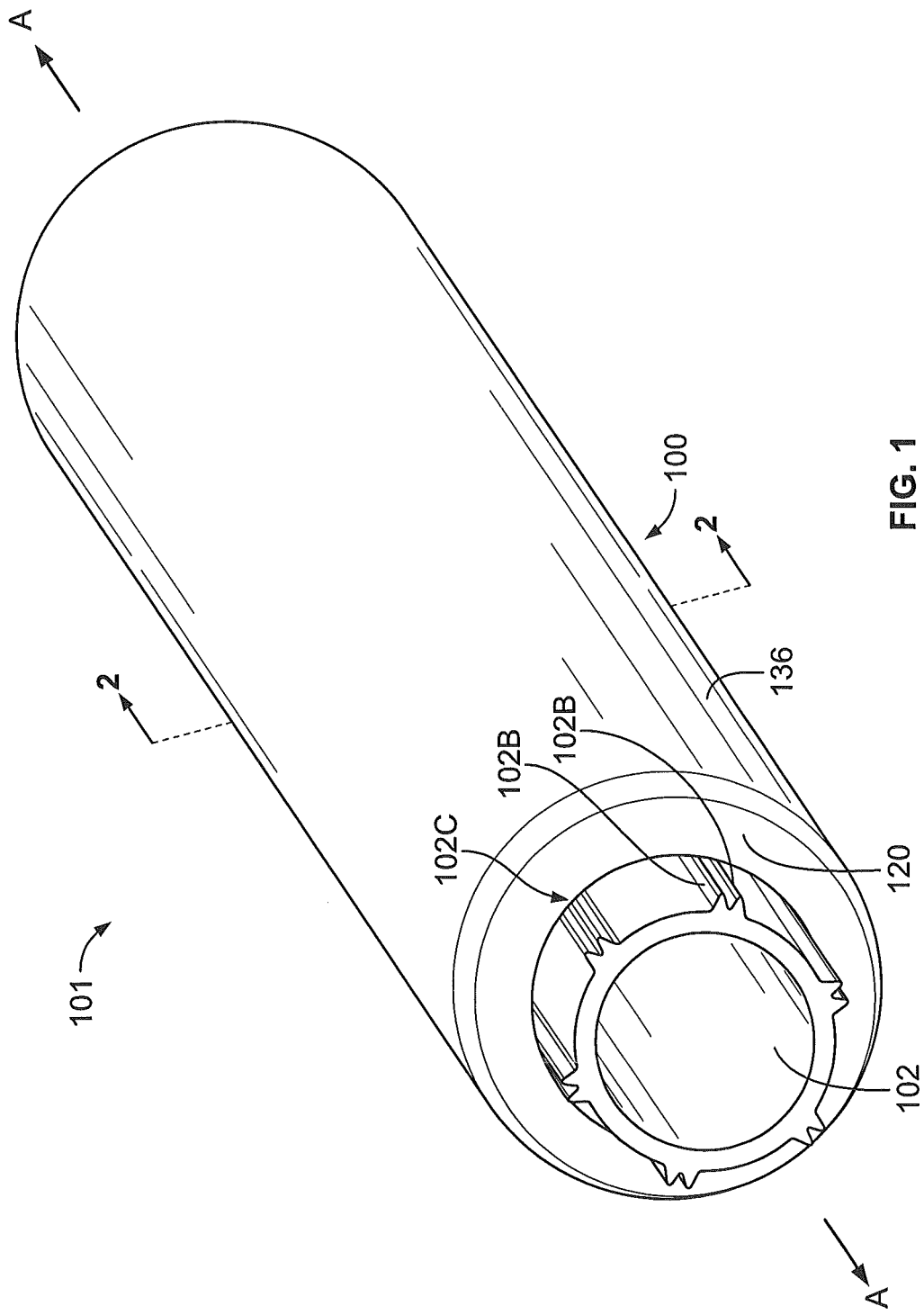
FIG. 1 is a perspective view of a pre-expanded joint body unit including a joint body according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

Figure 2:
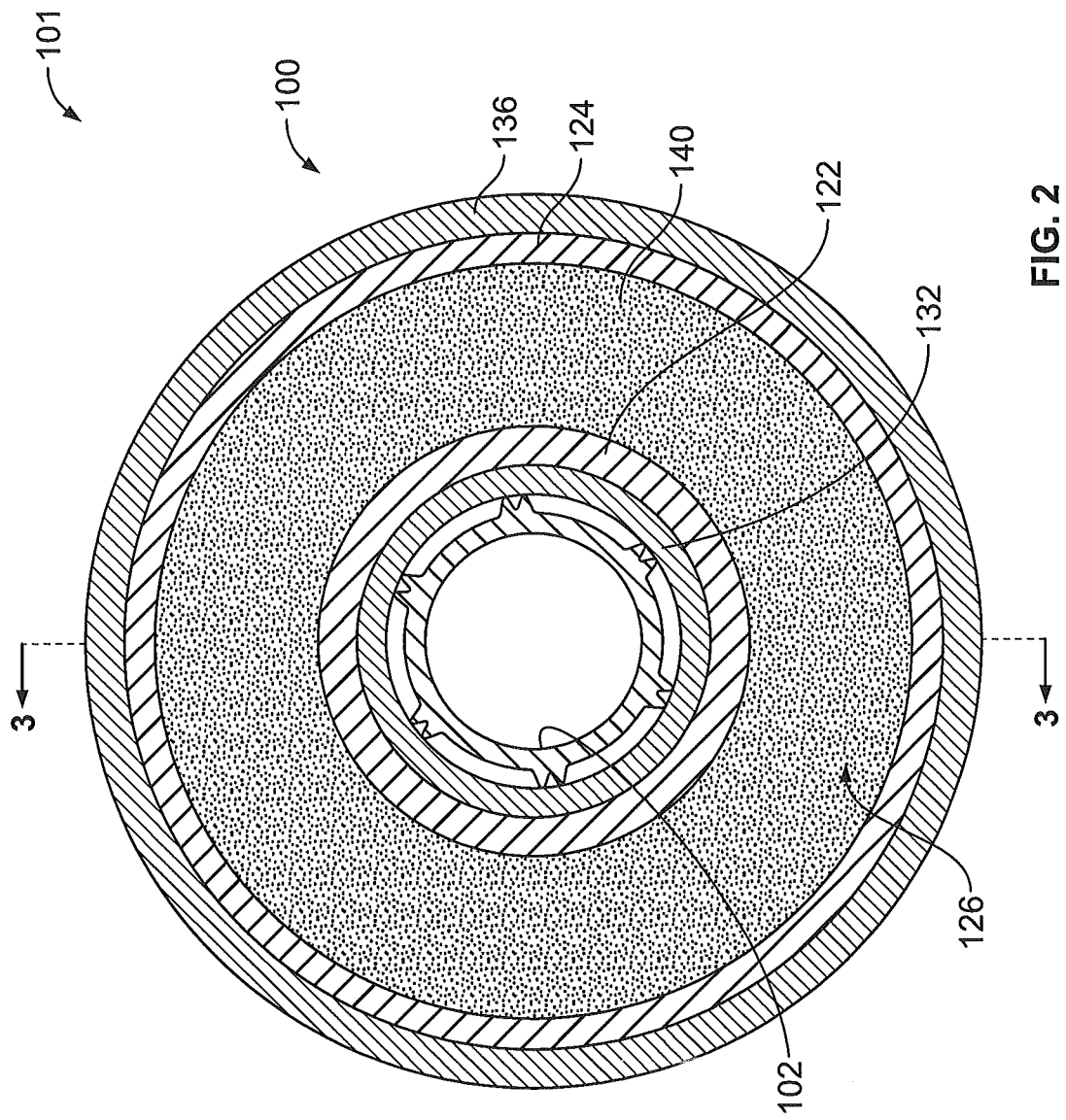
FIG. 2 is a cross-sectional view of the pre-expanded joint body unit of FIG. 1 taken along the line 2-2 of FIG. 1.
Figure 3:
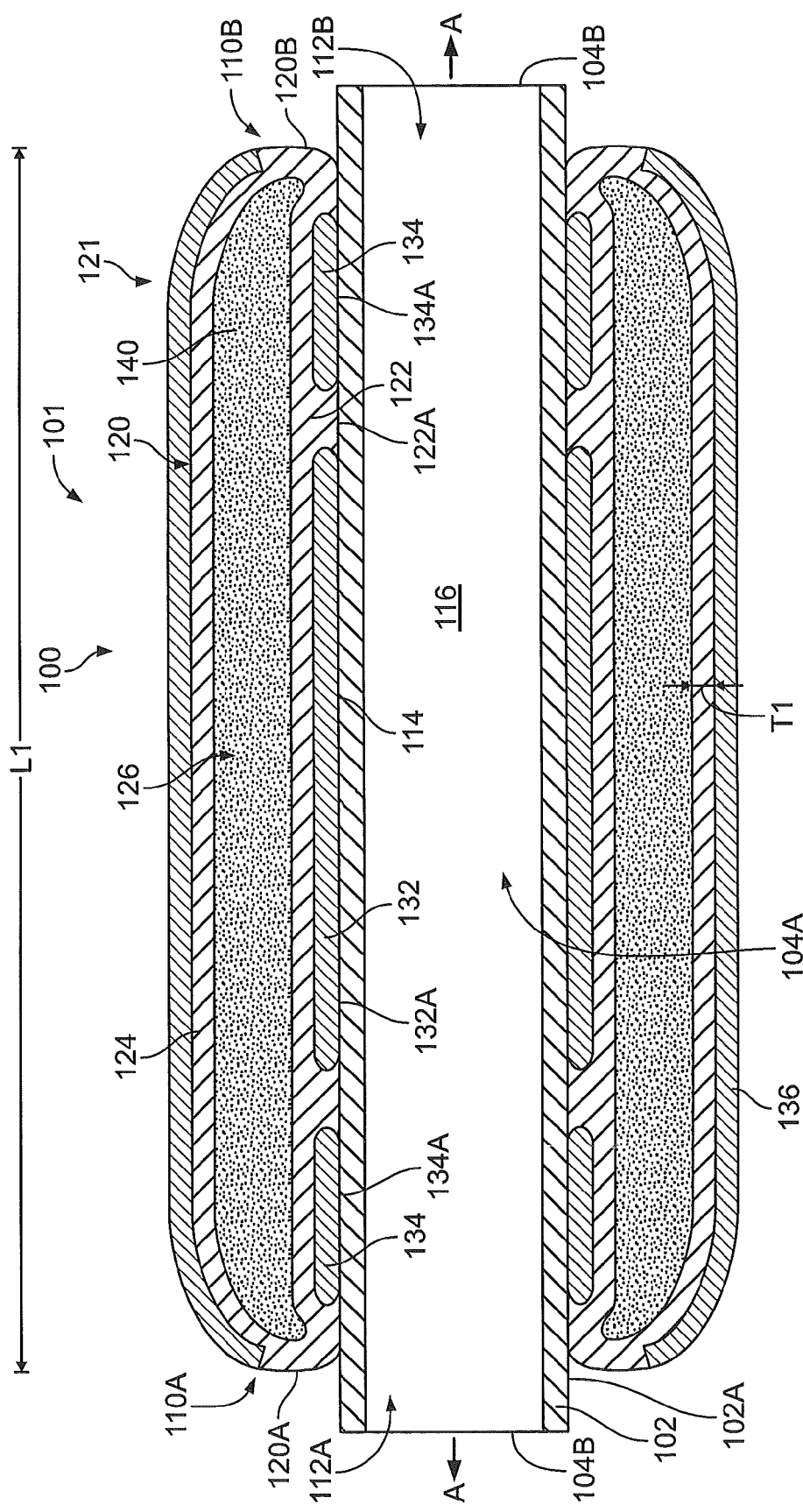
FIG. 3 is a cross-sectional view of the pre-expanded joint body unit of FIG. 1 taken along the line 3-3 of FIG. 2.

With reference to FIGS. 1-6, a joint body 100 according to some embodiments of the present invention is shown therein. The joint body 100 may be provided as a pre-expanded joint body unit 101 including a holdout device 102, as shown in FIGS. 1-3, wherein the joint body 100 is in an expanded state or position.

Figure 6:
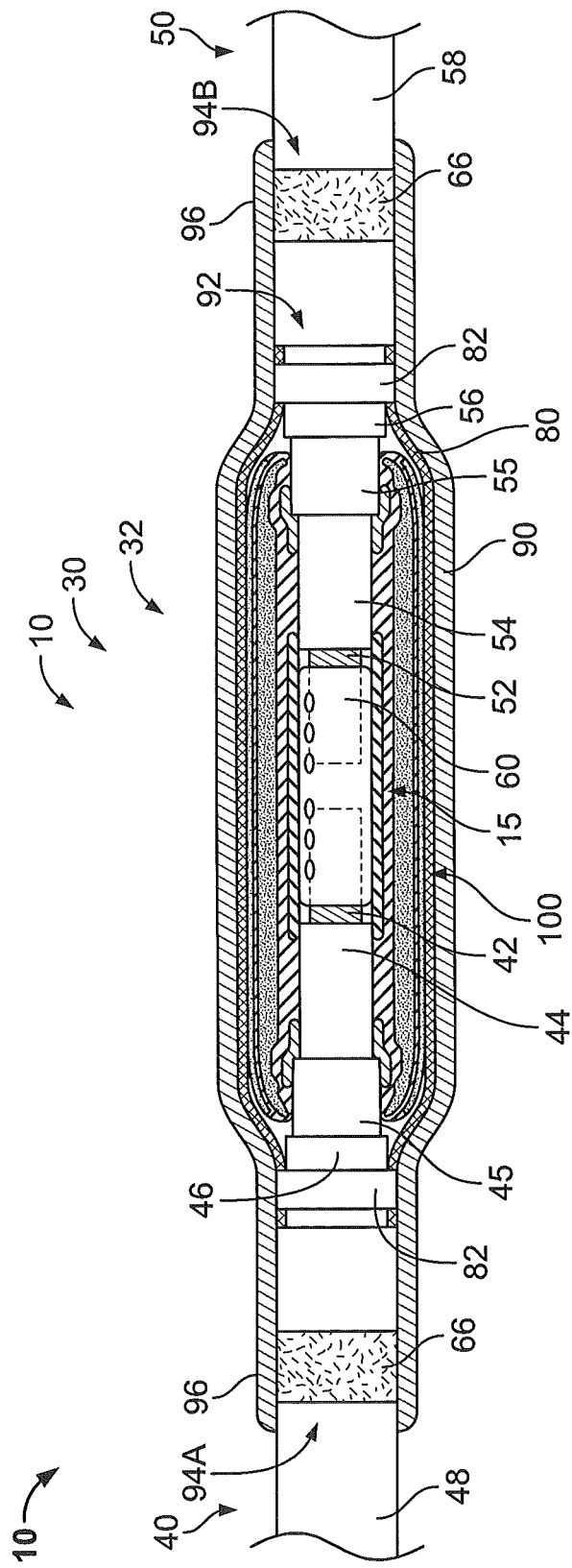
FIG. 6 is a cross-sectional view of a protected connection assembly including the joint body of FIG. 1.

The joint body 100 may be used to cover and electrically insulate electrical substrates such as cables and connectors. The joint body 100 may be used to cover and seal a connection or splice 15 between two or more cables 40, 50 including an electrical connector 60 to form a protected connection assembly 10 as shown in FIG. 6 (in this case, the joint body 100 may be referred to as a splice body). According to some embodiments, the cables 40, 50 are concentric neutral cables. According to some embodiments, the cables 40, 50 are metal tape shielded or longitudinally corrugated (LC) metal shielded cables. The joint body 100 may form a part of a cover system 30 further including one or more of a grounding and/or electrical shielding member (e.g., a copper mesh) 80, securing clamps 82, an outer or rejacketing sleeve 90, and cable sealing mastic 66, as shown in FIG. 6. When installed on the connection and cables, the cover system 30 forms a cover assembly 32 about the connection 15, thereby forming the protected connection assembly 10.

Figure 5:
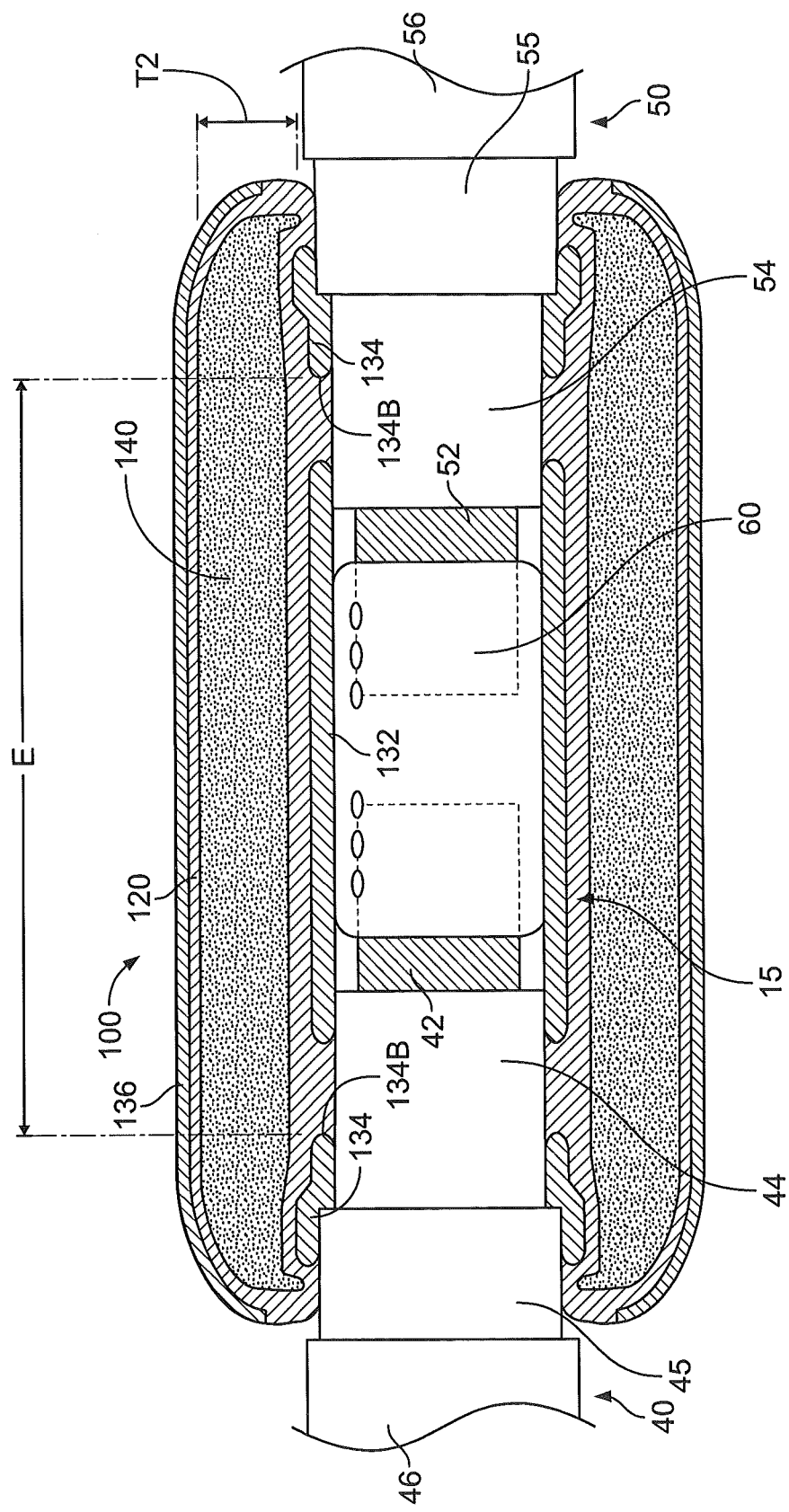
FIG. 5 is a cross-sectional view of the joint body of FIG. 1 installed on an electrical connection.

The joint body 100 may be deployed and mounted on the intended substrate in a retracted state or position as shown in FIGS. 5 and 6 and discussed in more detail below. According to some embodiments, the joint body 100 is a cold shrink cover, meaning that it can be shrunk or retracted about the substrate without requiring the use of applied heat.

The joint body 100 includes a containment or bladder sleeve 121 defining a chamber or cavity 126 filled with a mass of an electrically insulating gel 140, as discussed in more detail below.

The joint body 100 has a longitudinal central joint body axis A-A and extends from an end 110A to an opposing end 110B along the axis A-A. Openings 112A and 112B are defined at the ends 110A and 110B and communicate with an axially extending through passage 116 defined by an inner surface 114 of the joint body 100.

The bladder sleeve 121 is a tubular, integral, double-walled sleeve of unitary or single-piece construction. The sleeve 121 extends axially from an end 120A to an opposing end 120B. The sleeve 121 has a tubular inner wall 122 and a tubular outer wall 124 joined at the ends 120A, 120B. The inner wall 122 forms, in part, the inner surface 114. The walls of the sleeve 121 form an endless, continuous band. The cavity 126 is defined as an annular or tubular cavity between the inner wall 122 and the outer wall 124.

The bladder sleeve 121 includes a primary bladder layer 120, an integral Faraday cage layer 132, a pair of integral stress cone layers 134, and an integral outer screen or semiconductive layer 136. According to some embodiments and as illustrated, the primary bladder layer 120 is a tubular, integral, double-walled sleeve of unitary or single-piece construction. The Faraday cage layer 132 and the stress cone layers 134 are mounted on the inner wall 122 and form parts of the inner surface 114. The outer semiconductor layer 136 is mounted on the outer wall 124. According to some embodiments and as shown, the layers 132, 134, 136 are embedded in the walls 122, 124. In some embodiments, the inner surfaces 132A, 134A of the layers 132, 134 are substantially axially coplanar with the inner surface 122A of the inner wall 122 so that the joint body inner surface 114 of the joint body 100 presents a substantially uniform profile.

The primary bladder layer 120 can be formed of any suitable material. According to some embodiments, the bladder layer 120 is formed of a dielectric or electrically insulative material. According to some embodiments, the bladder layer 120 is formed of an elastically expandable material. According to some embodiments, the bladder layer 120 is formed of an elastomeric material. According to some embodiments, the bladder layer 120 is formed of liquid silicone rubber (LSR). Other suitable materials may include EPDM or ethylene propylene rubber (EPR). According to some embodiments, the bladder layer 120 has a Modulus at 100 percent elongation (M100) in the range of from about 0.10 to 1 MPa. According to some embodiments, the bladder layer 120 has a Shore A hardness of less than 40 and, in some embodiments, in the range of from about 30 to 50.

According to some embodiments, the thickness T1 (FIG. 3) of the bladder layer 120 is in the range from about 0.5 to 5 mm. According to some embodiments, the length L1 (FIG. 3) of the bladder layer 120 is in the range of from about 150 to 700 mm.

The Faraday cage layer 132 is a generally tubular sleeve bonded to the inner surface of the wall 122. The Faraday cage layer 132 may be formed of a suitable elastically conductive elastomer. In use, the Faraday cage layer 132 may form a Faraday cage to provide an equal potential volume about the connector 60 so that an electric field is cancelled in the surrounding air voids. The Faraday cage layer 132 has a Faraday cage interface surface 132A defining a portion of the joint body inner surface 114, and thereby a portion of the passage 116.

The stress cone layers 134 are axially spaced apart, generally tubular sleeves bonded to the inner surface of the wall 122 proximate either end 110A, 110B of the joint body 100. The stress cone layers 134 may be formed of a suitable electrically conductive elastomer. In use, the stress cone layers 134 may serve to redistribute the voltage along the surface of the cable insulation 44, 54 to reduce or prevent the degradation of the insulation 44, 54 that might otherwise occur. Each stress cone layer 134 has a stress cone interface surface 134A defining a portion of the joint body inner surface 114, and thereby a portion of the passage 116.

According to some embodiments, the Faraday cage layer 132 and the stress cone layers 134 are formed of a material having a Modulus at 100 percent elongation (M100) in the range of from about 0.5 to 2 MPa. According to some embodiments, the Faraday cage layer 132 and the stress cone layers 133 have a Shore A hardness of less than 80 and, in some embodiments, in the range of from about 50 to 70.

The semiconductive layer 136 is a generally tubular sleeve bonded to the outer surface of the wall 124 and fully circumferentially surrounds the layer 120. According to some embodiments, the semiconductive layer 136 extends axially at least the full distance between and overlaps the stress cone layers 134.

The semiconductive layer 136 can be formed of any suitable electrically semiconductive material. According to some embodiments, the semiconductive layer 136 is formed of an elastically expandable material. According to some embodiments, the semiconductive layer 136 is formed of an elastomeric material. According to some embodiments, the semiconductive layer 136 is formed of carbon black and silicone. Other suitable materials may include carbon black and EPDM. According to some embodiments, the semiconductive layer 136 is formed of a material having a Modulus at 100 percent elongation (M100) in the range of from about 0.5 to 2 MPa.

The gel sealant 140 may be any suitable gel sealant. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm, Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$1. \frac{(F_i - F_f)}{F_i} \times 100\%$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^1$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel 140 has a Voland hardness, as measured by a texture analyzer, of between about 5 and 100 grams force.

According to some embodiments, the gel 140 has an elongation, as measured in accordance with ASTM D638-10 (dated May 15, 2010), of at least 55%. According to some embodiments, the elongation is of at least 100%. The gel 140 may have a stress relaxation of less than 80%. The gel 140 may have a tack greater than about 1 gram.

According to some embodiments, the gel 140 has a volume resistivity of at least $10^{12}$ Ohm-cm and, in some embodiments, in the range of from about $10^{12}$ to $10^{15}$ Ohm-cm.

According to some embodiments, the gel 140 has a dielectric strength of at least 20 kV/cm and, in some embodiments, in the range of from about 15 to 25 kV/cm.

According to some embodiments, the gel 140 has a dielectric constant of at least 2 and, in some embodiments, in the range of from about 2.3 to 5.0.

According to some embodiments, the cover assembly 100 is provided pre-installed (e.g., at the factory) and pre-expanded on the holdout 102. The holdout 102 can be formed of any suitable material. The holdout 102 has an outer surface 102A and defines a through passage 104A communicating with opposed end openings 104B (FIG. 3). According to some embodiments, the holdout 102 includes axially extending sets of ribs 102B (FIG. 1). Grease or other lubricant may be provided in the channels 102C defined between the ribs 102B. The illustrated holdout 102 is a rigid, non-collapsible tube holdout. However, other types of holdouts may be employed. For example, the holdout may include a flexible strip helically wound to form a rigid cylinder and having a pull tab or end segment extending through the passage. According to some embodiments, the holdout 102 is formed of a rigid or semi-rigid polymeric material. According to some embodiments, the holdout 102 is formed of rigid cardboard, polypropylene, ABS, or PVC. The holdout device 102 may be factory installed in the joint body 100.

The joint body 100 and the pre-expanded unit 101 may be formed by any suitable method and apparatus. According to some embodiments, the gel 140 is pre-installed and sealed in the cavity 126 of the bladder layer 120, and the joint body 100 is thereafter installed on the holdout 102. According to some embodiments, the bladder layer 120 is formed, uncured gel material is inserted into the cavity 126, the uncured gel material is cured in situ within the cavity into the gel 140, and the gel 140 is fully sealed within the cavity 126 (before or after curing). In some embodiments, each of these steps is conducted at the factory. In this case, the bladder layer 120 is pre-filled with the cured gel 140 and the gel 140 is fully contained and sealed in the cavity 126 so that it is not necessary for an installer to handle or prepare the gel 140.

According to some embodiments, when mounted on the holdout 102, the joint body 100 is maintained in an elastically radially expanded state or position. According to some embodiment, in the expanded state the joint body 100 is expanded in the range of from about 5 to 100 percent of its relaxed diameter.

The outer sleeve 90 (FIG. 6) is tubular and defines an axially extending through passage 92 that communicates with opposed end openings at the ends 94A, 94B.

The outer sleeve 90 can be formed of any suitable material. According to some embodiments, the outer sleeve 90 is formed of an electrically insulative material. According to some embodiments, the outer sleeve 90 is formed of a polymeric material.

According to some embodiments, the outer sleeve 90 is a cold-shrinkable tube formed of an elastomeric material. The cold-shrinkable tube may be mounted on a holdout. According to some embodiments, the outer sleeve 90 is formed of EPDM rubber. Other suitable materials may include silicone rubber. According to some embodiments, the outer sleeve 90 has a Modulus at 100 percent elongation (M100) in the range of from about 0.25 to 2 MPa. According to some embodiments, the thickness of the outer sleeve 90 is in the range of from about 0.10 to 0.25 inch.

According to some embodiments, the outer sleeve 90 is a heat shrinkable tube formed of thermoplastic material. According to some embodiments, the outer sleeve 90 is formed of a thermoplastic polyolefin.

Referring now to FIG. 5, the joint body 100 and the cover system 30 may be applied over a splice connection 15 between a pair of electrical power transmission cables 40, 50 to form a protected connection assembly 10. According to some embodiments, the cables 40, 50 are medium-voltage (e.g., between about 5 and 35 kV) or high-voltage (e.g., between about 46 and 230 kV) power transmission cables.

Figure 4:
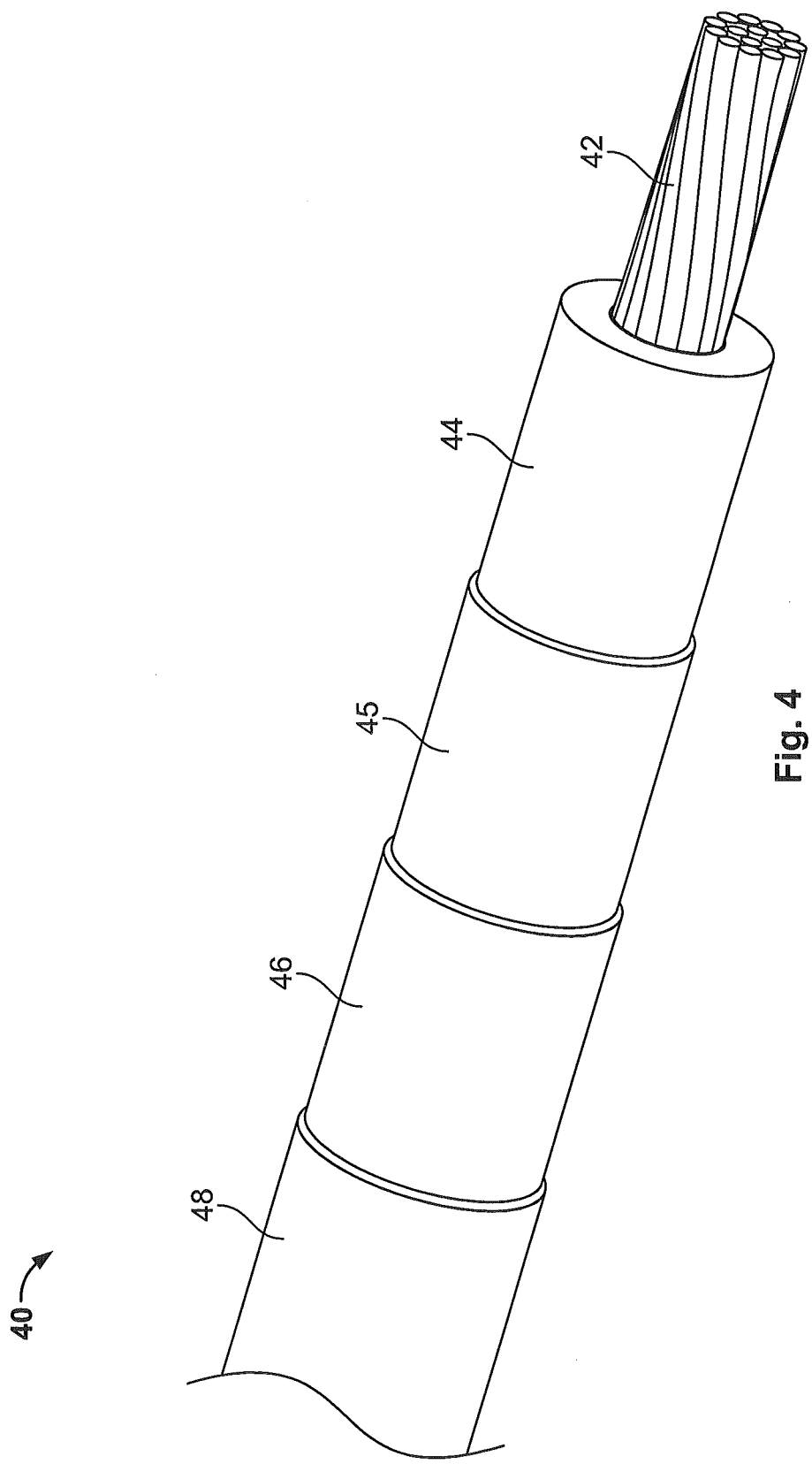
FIG. 4 is a perspective view of an electrical cable for use with the joint body of FIG. 1.

As shown in FIG. 4, the cable 40 includes a primary electrical conductor 42, a polymeric insulation layer 44, a semiconductor layer 45, a metal electromagnetic radiation shield layer 46, and a jacket 48, with each component being concentrically surrounded by the next.

According to some embodiments and as shown, the shield layer 46 is a metal tape, foil, strip or sheath fully circumferentially surrounding the semiconductor layer 45 along the length of the cable. The metal strip may be longitudinally or helically wrapped about the semiconductor layer 45, for example. According to some embodiments, the cable 40 is an LC shielded cable and the shield layer 46 is a thin corrugated metal layer. In other embodiments, the shield layer 46 may include individual wires, which may be helically wound about the semiconductor layer 45.

The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The shield layer 46 may be formed of any suitable material such as copper. The jacket 48 may be formed of any suitable material such as EPDM or PVC.

The cable 50 (FIG. 6) is similarly constructed with a primary electrical conductor 52, a polymeric insulation layer 54, a semiconductor layer 55, a metal shield layer 56, and a jacket 58 corresponding to components 42, 44, 45, 46 and 48, respectively.

The connection assembly 32 may be formed and the joint body 100 may be installed as follows. The cables 40, 50 are prepared as shown in FIG. 6 such that a segment of each layer extends beyond the next overlying layer.

The pre-expanded unit 101 is slid over one of the cables 40, 50. According to some embodiments, the inside diameter of the holdout 102 is greater than the outer diameter of each cable 40, 50 and the connector 60 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connector that are to be received in the passage 116 of the joint body 100. The pre-expanded unit 101 may be retained or parked on a cable 40, 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 5. The connector 60 may be any suitable type of connector such as a metal crimp connector.

The pre-expanded unit 101 is then slid into position adjacent, but not over, the connector 60. The joint body 100 is then pushed off the holdout 102 and over the connector 60 and adjacent portions of the cables 40, 50, thereby permitting the joint body 100 to relax and radially retract about the cables 40, 50 and the connector 60 as shown in FIG. 6, as discussed in more detail below.

Alternatively, the pre-expanded unit 101 is slid into position over the connector 60. The holdout 102 is then withdrawn or removed from the joint body 100, thereby permitting the joint body 100 to relax and radially retract about the cables 40, 50 and the connector 60 as shown in FIG. 6.

According to some embodiments, when installed, the joint body 100 is not fully recovered to its relaxed state, and therefore continues to apply a persistent radially compressive load or pressure to the cables 40, 50 and the connector 60.

According to some embodiments, the inner surface 114 of the bladder layer 120 directly engages the cables 40, 50 and the connector 60. According to some embodiments, the installed joint body 100 overlaps and engages the semiconductor layers 45, 55 of the cables 40, 50. More particularly, the each stress cone layer 134 overlaps and engages the semiconductor layer 45, 55 and the insulation layer 44, 54 of the respective cable 40, 50. The Faraday cage layer 132 overlaps and engages the connector 60 and the insulation layer 44, 54 of each cable 40, 50.

The shield mesh 80 may then wrapped around the joint body 100 and the semiconductor layers 45, 55 as shown in FIG. 6. A retainer 82 (e.g., a metal mesh web or clamp) can be wrapped about each cable 40, 50 as also shown in FIG. 6 to secure the end edges of the shield mesh 80. The retainers 82 may be wrapped about exposed ends of the shield layers 46, 56 to electrically connect the shield mesh 80 to the shield layers 46, 56. According to some embodiments, the shield mesh layer 80 fully circumferentially surrounds the joint body 100. According to some embodiments, the shield mesh layer 80 includes opposed end sections that extend beyond the ends of the joint body 100 but do not extend as far out as the outer sleeve 90. The shield mesh layer 80 may be formed of braided or woven copper filaments, for example.

Strips of flowable sealant 66 (FIG. 6) may be applied to the outer surfaces of the cable jackets 48, 58. According to some embodiments, the sealant 66 is a mastic. The operator then installs the outer sleeve 90 around the joint body 100 and the cables 40, 50 such that opposed end sections 96 of the outer sleeve 90 extend axially outwardly to cover the adjacent sections of the cables 40 and 50, respectively. According to some embodiments, at least a portion of each end section 96 overlaps a respective portion of each cable jacket 48, 58 and engages the associated sealant strip 66 to provide a moisture seal. According to some embodiments, the axial length of overlap between each end section 96 and the underlying jacket 48, 58 is at least 3 inches.

According to some embodiments, the installed outer sleeve 140 exerts a radially inwardly compressive or clamping force or pressure onto the cables 40, 50. The outer sleeve 90 may thereby effect a liquid tight seal at the interfaces between the end sections 96 and the cable jackets 48, 58 and at the interfaces between the cable jackets 48, 58 and the outer sleeve 90. These seals can protect the cable and the splice from the ingress of environmental moisture.

The relaxed inner diameter of the joint body 100 is less than at least the outer diameter of the cable insulation layers 44, 54. Therefore, the joint body 100 exerts a radially inwardly compressive or clamping force or pressure (due to elastic tension) onto the cables 40, 50 and the connector 60.

According to some embodiments, the installed joint body 100 applies a radially compressive load to the cables 40, 50 in the range of from about 10 to 60 psi.

According to some embodiments, the gel 140 has a nominal thickness T2 (FIG. 5) in the range of from about 0.10 to 1 inch in the span E defined between the inner edges 134B of the stress cone layers 134.

In some embodiments, it may be necessary or desirable to provide a supplemental restraint or compressive loading device about the joint body 100 to retain or increase the interface pressure between the inner wall 122 and the cables 40, 50 to ensure that the joint body 100 is sufficiently loaded against the cables 40, 50. The outer sleeve 90 may serve as a restraint or loading device to externally pressurize the joint body 100.

In some embodiments, the outer sleeve 90 is a heat shrink tube that is placed about the installed joint body 100 and then heat shrunk (i.e., by application of heat thereto) to contract the outer sleeve 90 about the joint body 100. The contracted heat shrink tube 90 may remain elastic and apply a persistent radially compressive load to the joint body 100 or may form a rigid shell.

In some embodiments, the outer sleeve 90 is a cold shrinkable elastomeric sleeve. The cold shrink sleeve 90 is placed about the installed joint body 100 in a radially expanded state and then released to radially contract about the joint body 100. The contracted cold shrink tube 90 may apply a persistent radially compressive load to the joint body 100.

In some embodiments, the outer sleeve 90 is a cold-applied wrap-around sleeve (elastomeric or thermoplastic). The wrap-around sleeve 90 is wrapped circumferentially tightly about the installed joint body 100 to radially compress the joint body 100. The wrap-around sleeve 90 may apply a persistent radially compressive load to the joint body 100.

In further embodiments, the outer sleeve 90 is a tape (e.g., a self-amalgamating tape) that is wrapped (e.g., helically) around installed joint body 100. The tape may remain elastic or may form a rigid shell.

In still further embodiments, the outer sleeve 90 is formed of two or more preformed rigid shells that are installed about the installed joint body 100 to partly or fully envelope the joint body 100. The shells may be configured and mounted such that they radially compress the joint body 100.

While a single, unitary outer sleeve 90 is illustrated, a plurality of outer sleeves may be used to cover the joint body 100. For example, two or more heat shrink tubes (or cold shrink tubes) may be mounted in axially seriated and imbricated relation about the joint body 100.

The foregoing outer sleeves 90 may be relied on alone to constrain and/or apply compression to the joint body 100. Alternatively, additional filler or pressurizing material may be injected into the cavity defined by the outer sleeve 90 or into the joint body 100 itself. For example, a pressurizing material may be injected between the outer sleeve 90 and the joint body 100 after the outer sleeve 90 has been installed about the joint body 100. The pressurizing material may be foam, compressed air, silicone compound, oil (e.g., mineral oil), or other suitable material. In some embodiments, the pressurizing material is a self-expanding foam (e.g., a PUR foam) that, once injected, volumetrically expands in situ to pressurize the joint body 100. In some embodiments, the pressurizing material is injected under pressure to apply the desired pressurization of the joint body 100.

In some embodiments, compression devices (in some embodiments, heat shrink tubes) are applied about the ends of the joint body 100 where the electrical field is screened by the stress cone layers 134 (i.e., axially outboard of the inner edges of the stress cone layers 134). These compression devices radially compress the ends of the joint body 100, displacing gel 140 from the ends of the bladder layer 120 and thereby pressurizing the bladder layer 120 internally and increasing the interface pressure between the inner wall 122 and the cables 40, 50.

Figure 7:
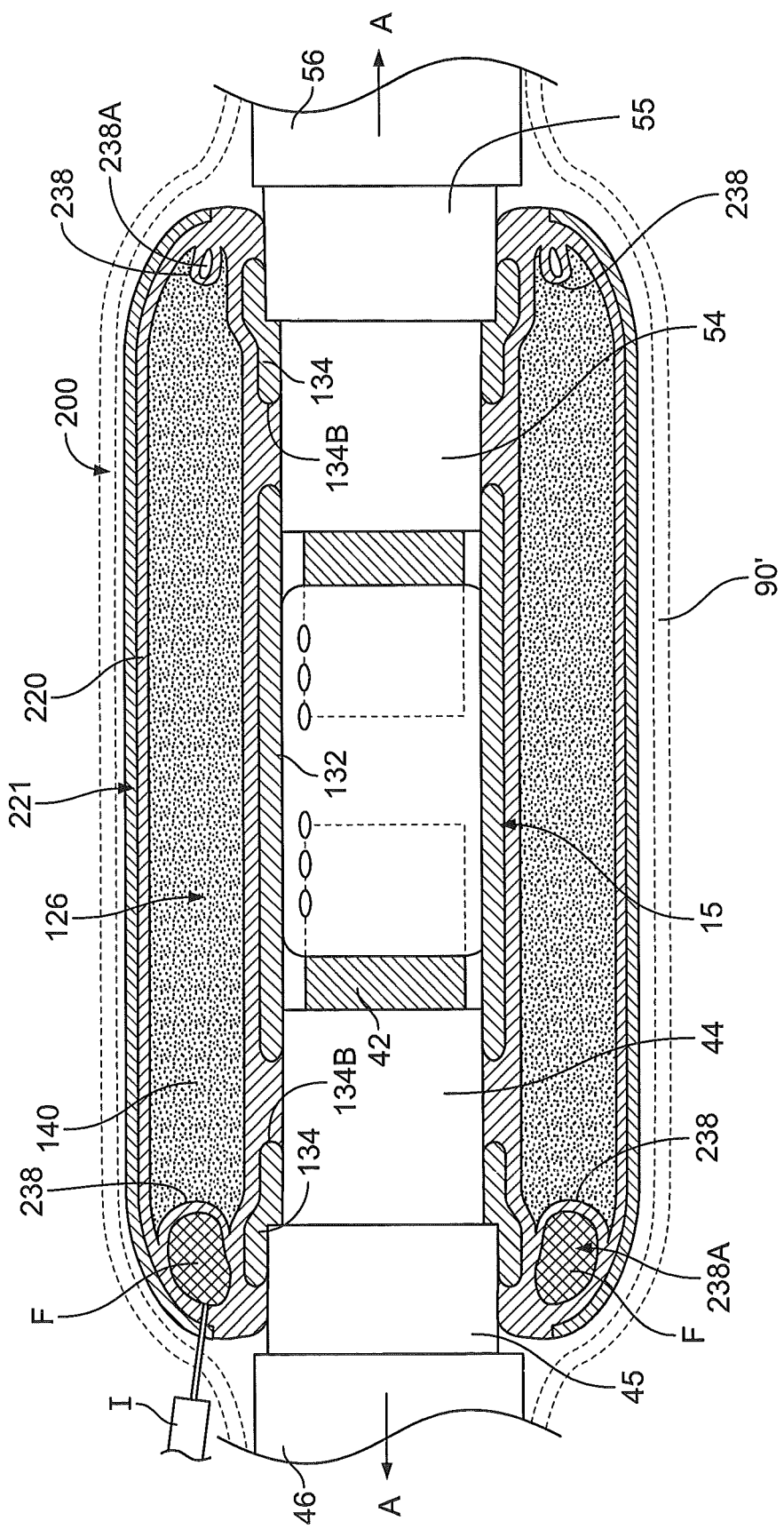
FIG. 7 is a cross-sectional view of a joint body according to further embodiments of the present invention mounted on an electrical connection.

With reference to FIG. 7, a joint body 200 is shown therein corresponding to the joint body 100 (and identical numerals refer to the same components) except that the joint body 200 further includes pressurizing or pressure control bladders 238 integrated into the joint body 200. The pressure control bladders 238 may be integrally formed with the bladder sleeve 221. Each pressure control bladder 238 defines a pocket, chamber or reservoir 238A to receive a mass of a pressurizing material as described above. In use, the pressurizing material F is injected (e.g., using an injection tool I such as a syringe) into one or more of the pressure control bladders 238 to inflate the pressure control bladder and thereby displace and pressurize the gel 140 in the cavity 126. The interfacial load between the joint body 200 and the cables 40, 50 is thereby increased. In FIG. 7, one of the pressure control bladders 238 is filled and the other pressure control bladder 238 is shown prior to filling. In some embodiments, the reservoirs 238A are annular and generally concentric with the joint body axis A-A. In some embodiments, the joint body 200 and the pressure control bladders 238 are configured and used such that the pressurizing material F is retained and does not extend axially inwardly of the inner edge 134B of the proximal stress cone layer 134, so that the pressuring material F is electrostatically shielded by the stress cone layer 134. An outer sleeve 90' (shown in dashed lines in FIG. 7) may be installed over the joint body 200 before or after injecting the pressuring material F so that the outer sleeve 90' restrains or resists radially outward expansion of the joint body 200. The outer sleeve 90' may be any of the outer sleeves described above with regard to the outer sleeve 90 (including preformed rigid shells). It will be appreciated that further components such as the shield mesh 80, clamps 82 and mastic 66 may also be installed over the joint body 200 but are omitted from FIG. 7 for the purpose of explanation.

Joint bodies according to embodiments of the invention can solve or mitigate a number of problems typically associated with known joint bodies such as thick-walled elastomeric joint bodies.

The inventive joint body can be provided with greater elasticity. The increase in elasticity can provide greater range taking ability. The greater elasticity presents lower recovery forces so that less force is required to expand and install the joint body on the connection. As a result, holdouts that are lighter, less expensive and easier to manufacture can be used. For example, a solid tubular holdout formed of a low friction material (as described above) can be used instead of a relatively expensive spiral holdout. Moreover, in accordance with some embodiments, the less tight fit of the joint body on the cables/connector and on the holdout can permit the joint body 100 to be pushed onto the connection as described above.

The integral Faraday cage layer 132 and stress cone layers 134 formed of electrically conductive elastomeric materials can serve to geometrically control the dielectric stress within the joint body 100 (primarily within the gel 140). The outer screen layer 136 can serve as an earthed screen (e.g., grounded via the copper mesh 80).

The higher elasticity of the joint body 100 also improves the electrical performance of the joint body by adapting more easily or conforming more closely to the shape of the prepared cable surface. This may be particularly important in case the terminal cut edge of the cable semiconductive layer 43, 55 is relatively steep and not smoothed out, which is typically the case with EPR cables. The flexible or compliant "skin" (i.e., the bladder layer 120) of the joint body 100 is beneficial in that it will follow the surface profile, of the cables 40, 50 and the connector 60 more easily.

The higher elasticity of the joint body 100 can also improve the performance of the joint body 100 during thermal cycling of the connection in service because the joint body 100 can follow the expansion and contraction of the cables 40, 50 as the conductor temperature changes.

Figure 8:
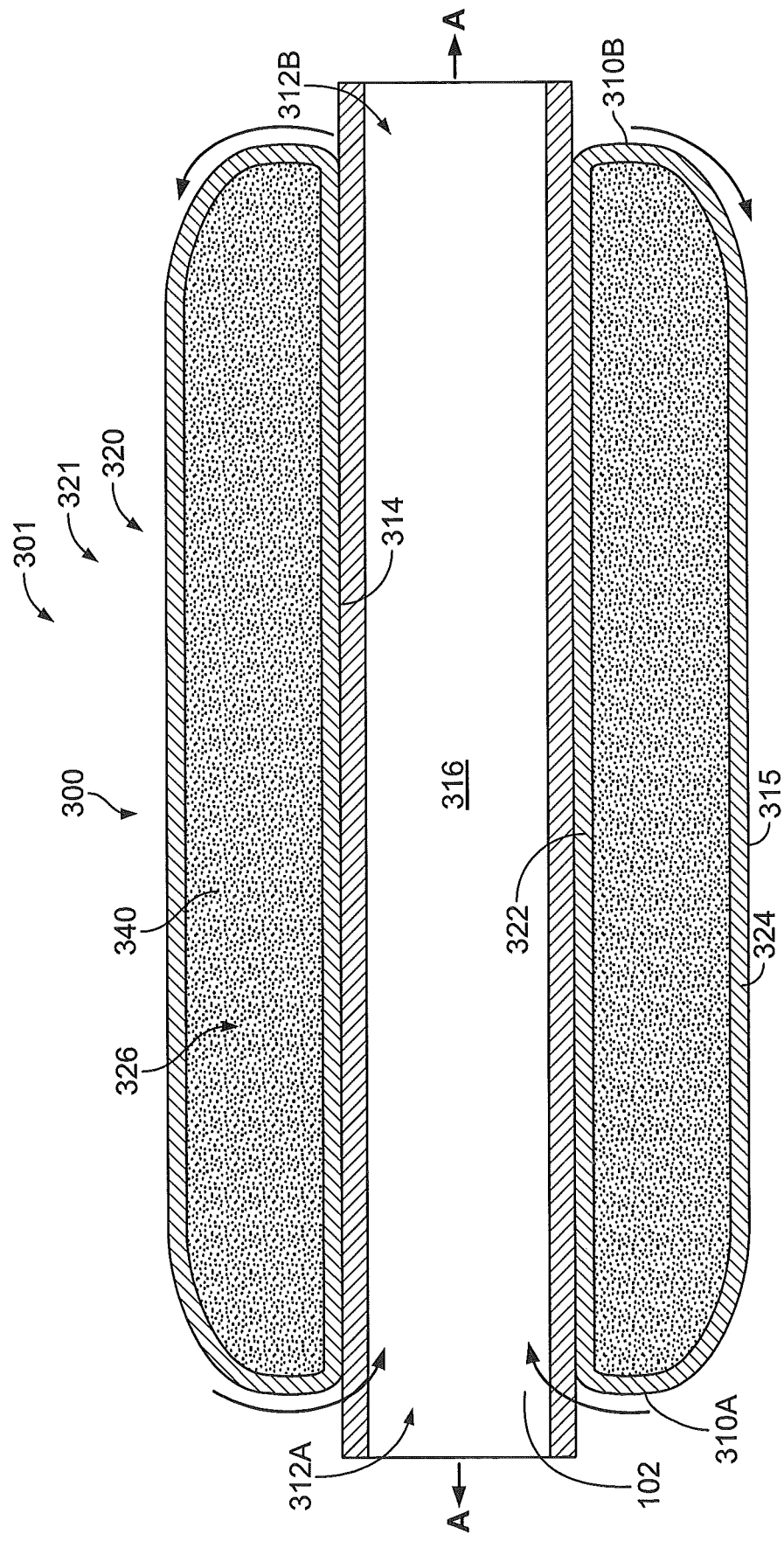
FIG. 8 is a cross-sectional view of a pre-expanded joint body unit including a joint body according to further embodiments of the present invention.
Figure 9:
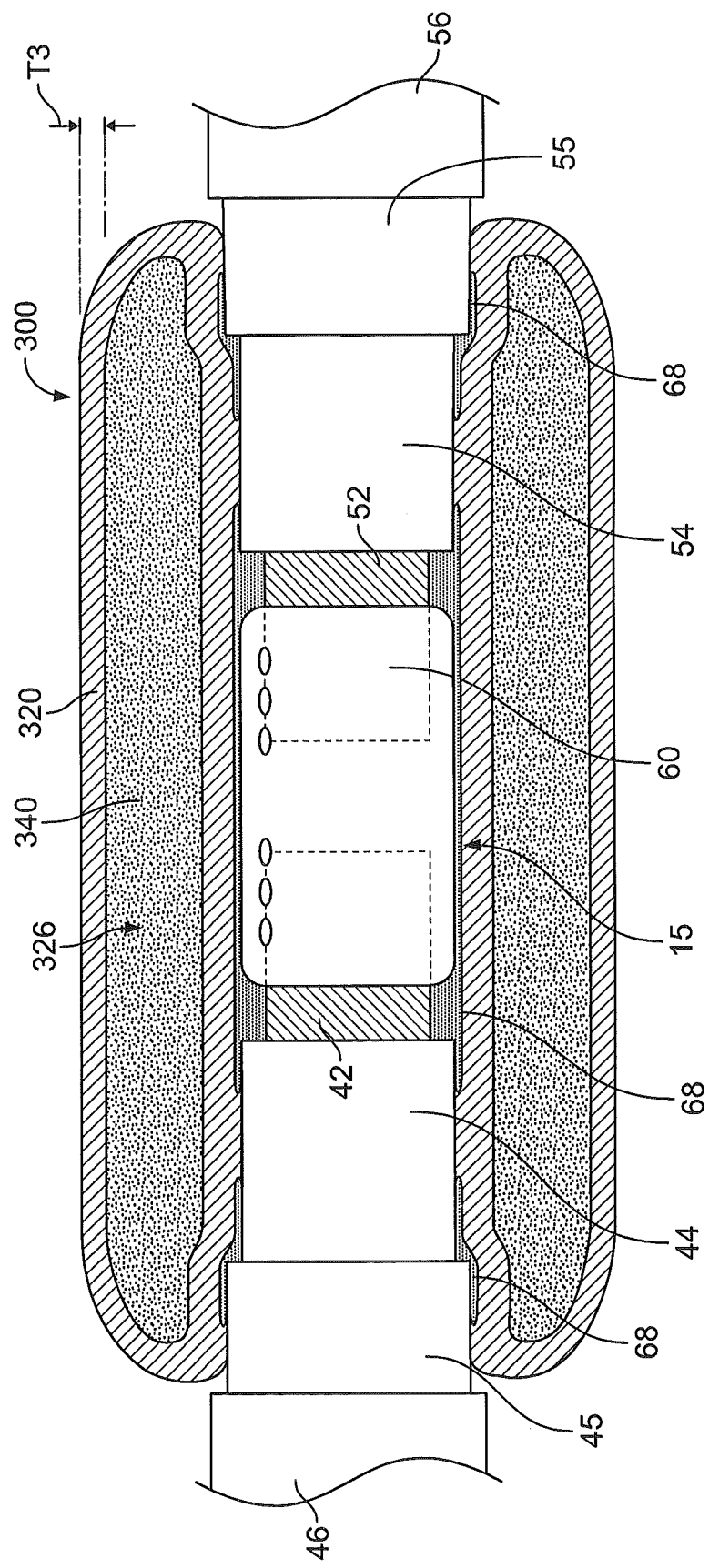
FIG. 9 is a cross-sectional view of the joint body of FIG. 8 mounted on an electrical connection.

With reference to FIGS. 8 and 9, a joint body 300 according to further embodiments of the present invention is shown therein mounted in an expanded condition on a holdout 102 to form a pre-expanded joint body unit 301. In FIG. 9, the joint body 300 is shown partially contracted and mounted on the connection 15. The joint body 300 can be used for the same purpose and in the same manner as the joint body 100 as discussed above, except as follows.

The joint body 100 includes a containment or bladder sleeve 321 defining a chamber or cavity 326 filled with a mass of an electrically insulating gel 340 (which may be the same as described above for the gel 140). The joint body 300 has a longitudinal central joint body axis A-A and extends from an end 310A to an opposing end 310B along the axis A-A. Openings 312A and 312B are defined at the ends 310A and 310B and communicate with an axially extending through passage 316 defined by a tubular inner surface 314 of the joint body 300. The joint body 300 has a tubular outer surface 315 opposite the inner surface 314.

The bladder sleeve 321 is a tubular, integral, double-walled sleeve of unitary or single-piece construction. The walls of the sleeve 321 form an endless, continuous band. According to some embodiments and as illustrated, the bladder sleeve consists of a single bladder layer 320. The bladder layer 320 extends axially from the end 310A to the end 310B. The bladder layer 320 has a tubular inner wall 322 and a tubular outer wall 324 joined at the ends 310A, 310B. The inner wall 322 forms the inner surface 314. The outer wall 324 forms the outer surface 315. The cavity 326 is defined as an annular or tubular cavity between the inner wall 322 and the outer wall 324.

The bladder layer 320 can be formed of any suitable material. According to some embodiments, the bladder layer 320 is formed of an elastically expandable and electrically conductive or semiconductive material having a high permittivity and, in particular, a higher permittivity than the cable insulation layers 44, 54 of the cables 40, 50. According to some embodiments, the bladder layer 320 is formed of a material having a dielectric constant in the range of from about 10 to 80. According to some embodiments, the bladder layer 320 if formed of a material having a volume resistivity in the range of from about $10^8$ to $10^{14}$ Ohm-cm. According to some embodiments, the bladder layer 320 has a thickness T3 (when installed) in the range of from about 0.10 to 0.25 inch. According to some embodiments, the bladder layer 320 is formed of an elastomeric material. According to some embodiments, the bladder layer 320 is formed of EPDM or silicone elastomer. According to some embodiments, the bladder layer 320 has a Modulus at 100 percent elongation (M100) in the range of from about 0.5 to 2.5 MPa.

The joint body 300 can be mounted on the connection 15 as shown in FIG. 9 for example. Additional components including the shield layer 80, clamps 82, mastic 66, an outer sleeve 90 (of the varying types and constructions discussed above), and/or a pressurizing material may be installed about the joint body 300 in the same manner as described about with regard to the joint body 100. In some embodiments, an electrical stress grading material 68 (e.g., a stress control mastic) is installed between and at the interfaces between the cables 40, 50 and the connector 60 and the inner surface 314.

When installed on the connection 15 as shown in FIG. 9, the high permittivity material of the inner wall 322 serves as electrical stress grading material along the surfaces of the cables 40, 50 to control electrical stress in the joint body 300 (primarily in the gel-filled cavity 326). The high permittivity of the outer wall 324 serves as an electrostatic shield or screen (when suitably grounded) for the joint body 300. An additional electrically conductive layer such as the copper mesh 80 (FIG. 6) may be applied to the outer surface 315 to ensure that the earth potential is maintained all along the high permittivity outer wall 324. The design of the joint body 300 can also provide dielectric stress grading for shield break points where the ends of cable screens can carry significant voltages against each other and against earth.

The joint body 300 may be installed on the connection 15 by pushing the joint body 300 off of the holdout 102 or pulling the holdout out of the joint body 300 as described above with regard to the joint body 100.

According to some embodiments, the joint body 300 is rolled into position on the connection 15. More particularly, the endless, continuous band bladder sleeve 321 is axially revolvable about itself so that portions thereof that constitute the inner wall 322 and the outer wall 324 at any given time may vary depending on the position of the bladder sleeve 321. Likewise, the portions of the bladder sleeve 321 positioned at the ends 310A, 310B will change as the sleeve is revolved or rolled. That is, when the bladder sleeve 321 is revolved along its axis (e.g., as indicated by the arrows in FIG. 8), the bladder sleeve 321 will evaginate (i.e., turn inside-out by eversion of the inner wall) at one end and invaginate (i.e., turn outside-in by inversion of the outer wall) at the other (opposite) end. Because the entire exposed surface (surfaces 314 and 315) of the joint body 300 is formed of the high permittivity material, the final position of the joint body 300 is flexible and the stress grading feature is not position sensitive.

In order to facilitate rolling the joint body 300, the gel 340 may be softer and/or have a greater liquid content than the gel 140. According to some embodiments, the joint body 100 may be constructed for and installed by rolling the joint body 100 onto the connection.

Figure 10:
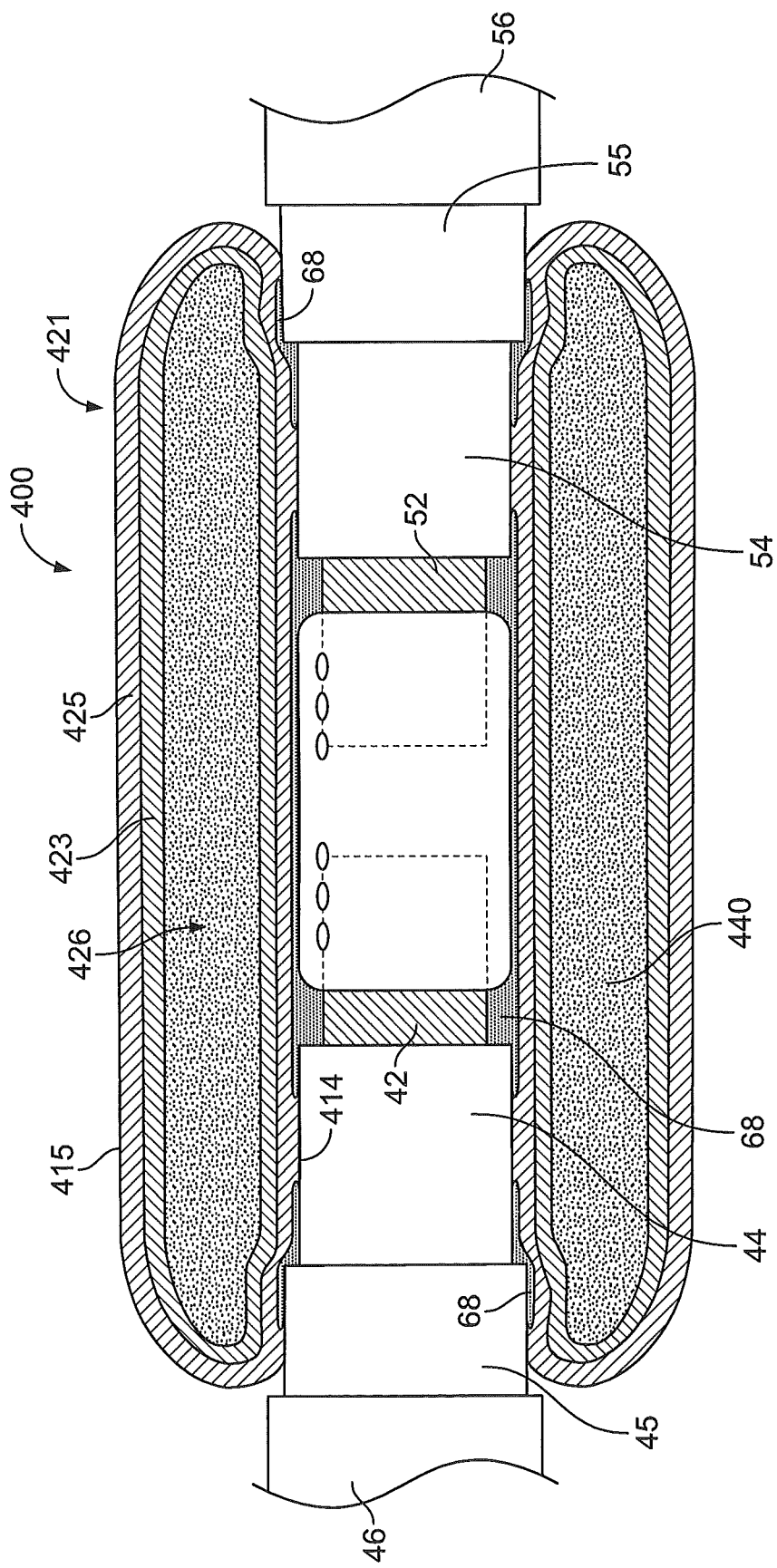
FIG. 10 is a cross-sectional view of a joint body according to further embodiments of the present invention mounted on an electrical connection.

With reference to FIG. 10, a joint body 400 according to further embodiments of the present invention is shown therein mounted on the connection 15. The joint body 400 can be used for the same purpose and in the same manner as the joint body 400 as discussed above, except as follows. The joint body 400 can likewise be provided as a pre-expanded unit on a holdout.

The joint body 400 differs from the joint body 300 in that the bladder sleeve 421 of the joint body 400 includes two intimate layers 423 and 425. The layers 423 and 425 may be co-laminated or co-extruded, for example. The exterior layer 425 (which surrounds the interior layer 423 and forms the innermost and outermost surfaces 414 and 415) has greater electrical conductivity than the interior layer 423 (i.e., the layer more proximate and defining the cavity 426 filled with the gel 440). The interior layer 423 may be formed of an electrically insulating material as described above with regard to the bladder layer 120. The exterior layer 425 may be formed of a high permittivity material as described above with regard to the bladder layer 320.

According to further embodiments, a joint body having integral electrically conductive elements (e.g., the joint body 100 having layers 132, 134, 136) may also be provided with a high permittivity outermost surface layer corresponding to the layer 425.

According to some embodiments, the bladder sleeve of the joint body (e.g., the bladder sleeve 121, 221, 321, or 421) is formed of or includes a layer of a material (e.g., a metal foil or metalized layer) offering a low moisture absorption and a low moisture vapor transmission rate to protect the contained gel from moisture induced deterioration. Moisture ingress can also be avoided or inhibited by using a heat shrink wraparound sleeve incorporating metallic foil as an outer protective sleeve.

While joint bodies as illustrated are mounted on holdouts in an expanded state, joint bodies according to some embodiments may be mounted on a support or holdout in a substantially non-expanded state and pushed therefrom onto the cable or connection, or may be provided without a support or holdout and pushed onto a cable or connection.

According to some embodiments, an electrical connector of a different type may be used in place of the shear bolt connector 60. For example, the connector may be a compression, mechanical or any other suitable type of connector.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A joint body for protecting an electrical cable connection including an electrical cable, the joint body comprising:
   an expandable, elastomeric bladder sleeve defining a gel cavity and a cable passage to receive the electrical cable; and an electrically insulating gel disposed in the gel cavity and surrounding at least a portion of the cable passage;
wherein the joint body is configured to be installed on the connection such that the connection is disposed in the cable passage and is surrounded and electrically insulated by the gel;
wherein the bladder sleeve is a double-walled, tubular sleeve defining the gel cavity between the walls thereof; and
wherein the bladder sleeve includes:
an elastomeric, electrically insulating primary bladder layer defining the gel cavity;
an electrically conductive Faraday cage layer integral with the primary bladder layer and forming a part of an inner surface defining the cable passage; and
an electrically conductive stress cone layer integral with the primary bladder layer and forming a part of the inner surface.

2. The joint body of claim 1 wherein the bladder sleeve is radially elastically expandable.

3. The joint body of claim 1 further including an electrically conductive outer screen layer forming an outer surface of the joint body.

4. The joint body of claim 1 including a pressurizing bladder defining a pressurizing chamber sealed off from the gel cavity and adapted to receive a pressurizing material to pressurize the joint body.

5. The joint body of claim 1 wherein the gel is pre-sealed and cured in the gel cavity.

6. The joint body of claim 1 including a removable holdout mounted in the cable passage to maintain the bladder sleeve in an elastically radially expanded state, wherein the holdout is selectively removable from the joint body to permit the joint body to elastically radially contract about the connection.

7. The joint body of claim 1 wherein the bladder sleeve is formed of an elastomeric material selected from the group consisting of EPDM elastomer and silicone elastomer.

8. The joint body of claim 1 wherein the gel is a gel selected from the group consisting of silicone-based gel and hydrocarbon oil-based gel.

9. The joint body of claim 1 wherein the Faraday cage layer and the stress cone layer are embedded in the primary bladder layer.

10. The joint body of claim 1 wherein the primary bladder layer forms a part of the inner surface.

11. A method of protecting an electrical cable connection including an electrical cable, the method comprising:
providing a joint body including:
an expandable, elastomeric bladder sleeve defining a gel cavity and a cable passage to receive the electrical cable; and
an electrically insulating gel disposed in the gel cavity and surrounding at least a portion of the cable passage; and
installing the joint body on the connection such that the connection is disposed in the cable passage and is surrounded and electrically insulated by the gel;
wherein the bladder sleeve is a double-walled, tubular sleeve defining the gel cavity between the walls thereof; and
wherein the bladder sleeve includes:
an elastomeric, electrically insulating primary bladder layer defining the gel cavity;
an electrically conductive Faraday cage layer integral with the primary bladder layer and forming a part of an inner surface defining the cable passage; and
an electrically conductive stress cone layer integral with the primary bladder layer and forming a part of the inner surface.

12. The method of claim 11 wherein installing the joint body on the connection includes:
providing a pre-expanded joint body unit including the joint body mounted on a holdout in an elastically radially expanded state;
positioning the pre-expanded joint body unit adjacent the connection; and thereafter
removing the holdout from the joint body or removing the joint body from the holdout to permit the joint body to elastically radially contract onto the connection.

13. The method of claim 11 wherein:
the joint body includes a pressurizing bladder defining a pressurizing chamber sealed off from the gel cavity; and
the method further includes, after installing the joint body on the connection, injecting a pressurizing material into the pressurizing chamber to pressurize the joint body.

14. The method of claim 11 further including installing an outer sleeve around the joint body on the connection such that the outer sleeve radially constrains the joint body.

15. The method of claim 14 wherein the outer sleeve applies a persistent radially compressive load to the joint body.

16. The method of claim 11 wherein the gel is sealed and cured within the gel cavity prior to the step of installing the joint body on the connection.

17. The method of claim 11 wherein the Faraday cage layer and the stress cone layer are embedded in the primary bladder layer.

18. The method of claim 11 wherein the primary bladder layer forms a part of the inner surface.

19. A protected connection assembly comprising:
an electrical cable connection including an electrical cable; and
a joint body including:
an expandable, elastomeric bladder sleeve defining a gel cavity and a cable passage to receive the electrical cable; and
an electrically insulating gel disposed in the gel cavity and surrounding at least a portion of the cable passage;
wherein the joint body as installed on the connection such that the connection is disposed in the cable passage and is surrounded and electrically insulated by the gel;
wherein the bladder sleeve is a double-walled, tubular sleeve defining the gel cavity between the walls thereof; and
wherein the bladder sleeve includes:
an elastomeric, electrically insulating primary bladder layer defining the gel cavity;
an electrically conductive Faraday cage layer integral with the primary bladder layer and forming a part of an inner surface defining the cable passage; and
an electrically conductive stress cone layer integral with the primary bladder layer and forming a part of the inner surface.

20. The protected connection assembly of claim 19 wherein the connection is a splice connection including an electrical connector and a pair of electrical cables electrically and mechanically coupled by the connector.

21. The protected connection assembly of claim 19 wherein the Faraday cage layer and the stress cone layer are embedded in the primary bladder layer.

22. The protected connection assembly of claim 19 wherein the primary bladder layer forms a part of the inner surface.

23. A method of protecting an electrical cable connection including an electrical cable, the method comprising:

providing a joint body including:

an expandable, elastomeric bladder sleeve defining a gel cavity and a cable passage to receive the electrical cable; and an electrically insulating gel disposed in the gel cavity and surrounding at least a portion of the cable passage; and installing the joint body on the connection such that the connection is disposed in the cable passage and is surrounded and electrically insulated by the gel;

wherein the bladder sleeve is a double-walled, tubular sleeve defining the gel cavity between the walls thereof; and wherein:

the joint body includes a pressurizing bladder defining a pressurizing chamber sealed off from the gel cavity; and the method further includes, after installing the joint body on the connection, injecting a pressurizing material into the pressurizing chamber to pressurize the joint body.

* * * * *